United States Patent [19]

Tompkins

[11] Patent Number: 4,922,647
[45] Date of Patent: May 8, 1990

[54] FISHING LURE

[76] Inventor: Keith M. Tompkins, P.O. Box 30, 85 Church St., Moreland, Ga. 30259

[21] Appl. No.: 282,594

[22] Filed: Dec. 12, 1988

[51] Int. Cl.$^5$ ............................................. A01K 85/00
[52] U.S. Cl. ..................................... 43/42.44; 43/42.45
[58] Field of Search .................... 43/42.44, 42.45, 42.4, 43/42.41, 42.31

[56] References Cited

U.S. PATENT DOCUMENTS

| | | | |
|---|---|---|---|
| 1,854,024 | 4/1931 | Farley | 43/42.44 |
| 1,873,682 | 4/1930 | Van Ness | 43/42.44 |
| 2,168,476 | 4/1937 | Hartung | 43/42.44 |
| 2,424,096 | 10/1944 | Janchan | 43/42.41 |
| 3,034,249 | 3/1960 | Hawks | 43/42.35 |
| 4,432,157 | 2/1984 | Gowing | 43/42.35 |

Primary Examiner—Kurt Rowan
Assistant Examiner—Michael William Starkweather
Attorney, Agent, or Firm—Michael C. Smith

[57] ABSTRACT

A rigid wobble-type fishing lure comprising one single shaft weedless hook loosely secured to the lure at two locations which permit the hook to swing and tilt from side to side to enhance vibration of the lure and emit fish attracting sound vibration.

15 Claims, 1 Drawing Sheet 4,922,647

FISHING LURE

TECHNICAL FIELD

The present invention relates generally to fishing lures, specifically to a "weedless" type fishing lure, and more specifically to a weedless, rigid, wobbling fishing lure having a swinging, tilting hook attached thereto.

BACKGROUND ART

It is well known in the fishing lure arts that conventional rigid fishing lures, spoons, and skirted hooks are well adapted for catching fish, but because of the exposure of the fishing hooks, these lures cannot ordinarily be used in water which includes cover such as weeds, brush or trees. Such lures are shown in U.S. Pat. Nos. 2,425,272; 2,938,293; 4,283,876; 2,736,123; 2,994,982; 1,320,570; 2,547,279; 3,590,514; 1,682,711; 1,657,966; 4,432,157; 1,604,784; 1,992,766; and 2,567,813.

"Weedless" fishing hooks are also well known in the art. These include a weedless hook having a weed guard such as that shown in U.S. Pat. Nos. 3,605,318; 3,562,948 and 2,333,174.

A standard fishing hook may also be made "weedless" when used with a soft plastic worm by burying the hook and barb within the body of the plastic worm. While it is possible to adapt a weedless type hook having a weed guard with a rigid fishing lure, there have been no effective means of making rigid, baitfish imitating, wobbling lures "weedless" until the present invention. It is for this reason that the present lure was invented.

DISCLOSURE OF INVENTION

The present invention provides a superior rigid wobbling lure with the weedless advantage. This invention is a rigid wobbling fishing lure provided with attachment means for loosely securing the lure to a fishing hook at the eye of the hook and at a non-eye location of the hook to promote vibration of the hook. The preferred embodiment is a rigid, wobbling lure with a single shaft hook having a longitudinal axis parallel to the longitudinal axis of the lure, and loosely secured at the eyelet of the hook to a forward portion of the lure with an additional loose securement along the shaft of the hook to promote side to side movement of the hook in response to the wobble of the lure body.

Thus a major object of the present invention is to provide a rigid, wobbling fishing lure having the "weedless" advantage.

Another object of the present invention is to provide a rigid, wobbling fishing lure having means for vibrating the hook from side to side, so as not to hinder lure body vibrations.

Yet another object of this invention is to provide means for loosely retaining a hook atop the back of a rigid lure, behind the point of attachment of the fishing line.

Still another object is to provide rigid lures which do not become excessively entangled together in a tackle box.

Another object is to provide the described lure with the advantage of emitting a fish attracting sound vibration.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanied drawings in which like parts are given like identification numerals and wherein:

BEST MODE FOR CARRYING OUT THE INVENTION

Figure 1:
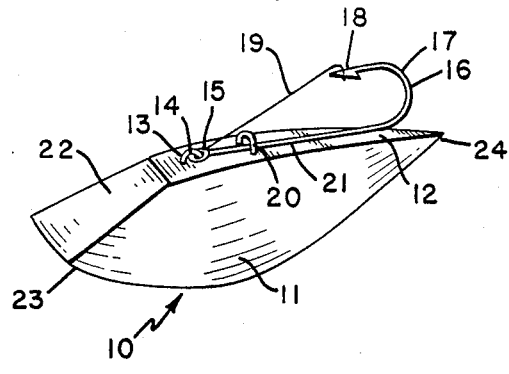
FIG. 1 is a perspective view of the preferred embodiment of the present invention.

As FIG. 1 illustrates, the preferred embodiment of the rigid wobbling lure 10 comprises a baitfish appearing body 11 made of a substantially rigid material such as wood, metal, plastic or hard rubber. Atop the back 12 of body 11 is a non-flexible attachment means 13, comprising a transverse aperture 14 to which the eye 15 of fishing hook 16 is permanently attached. In the alternative, the attachment means 13 may have a longitudinal aperture 14 for use with a fishing hook 16 having an eye 15 parallel to the curve 17 and point 18 of the fishing hook 16. While fishing hook 16 incorporates a weed guard 19, a fishing hook 16 without a weed guard 19 may be used because of the generally upward alignment of the fishing hook 16. Fishing hook 16 is a single shaft fishing hook, and is loosely secured to body 11 by a yoke 20 having a longitudinal aperture through which the shaft 21 of the hook passes. This dual, loose, permanent retention allows the fishing hook 16 to swing, vibrate and tilt while maintaining a hook setting position in response to wobble of body 11. In this manner, the rigid lure 10 becomes weedless for use in areas where conventional rigid lures would snag and become tangled with underwater obstacles such as brush, logs and rocks. In this embodiment, attachment means 13 is secured at a position atop body 11 and is in a vertical plane passing through the longitudinal axis of the body 11.

Yoke 20 is positioned atop back 12 in an alignment substantially perpendicular to the longitudinal axis of body 11, at a predetermined distance behind attachment mean 13. That distance is relative to the width of the inside dimension of yoke 20. The width of yoke 20 is not greater than 82.61% of the distance from yoke 20 to attachment means 13. The preferred width of yoke 20 is 45.83% of the distance from yoke 20 to attachment means 13.

For example, a yoke 20 with an inside dimension of 0.1250 inch will be positioned 0.1513 inch from attachment means 13, permitting fishing hook 16 to swing laterally, from side to side, in an arc of about 45 degrees; and a yoke 20 having an inside dimension of 0.1250 inch will be positioned 0.2728 inch from attachment means 13, permitting fishing hook 16 to swing laterally, from side to side, in an arc of about 25 degrees. A yoke 20 with an inside dimension of 0.1875 inch will be positioned 0.2270 inch from attachment means 13, permitting fishing hook 16 to swing laterally, from side to side, in an arc of about 45 degrees; and a yoke having an inside dimension of 0.1875 inch will be positioned 0.4091 inch from attachment means 13, permitting fishing hook 16 to swing laterally, from side to side, in an arc of about 25 degrees.

Lure 10 is provided with a substantially flat nose 22 which promotes wobbling movement of the lure 10. Since many fish inhabit underwater structures, anglers using the present invention have the ability to structure fish while avoiding substantially all of the disadvantages inherent in conventional rigid lures. Thus, the present invention is sufficiently versatile to eliminate substantially all disadvantages of prior art rigid lures while retaining substantially all of the advantages and adding the advantage of a weedless lure and a vibration enhancing hook. This arrangement also substantially eliminates the tangling of rigid lures in a tackle box.

Figure 2:
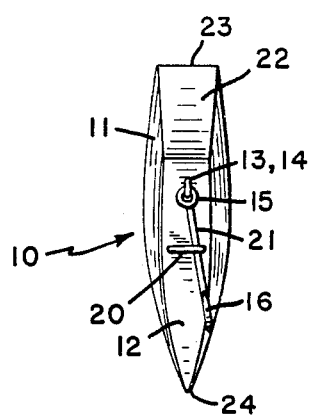
FIG. 2 is a top view of the preferred embodiment of the present invention.

Referring to FIG. 2, it can be seen that the fishing hook 16 is allowed to swing from side to side to increase the vibratory effect of the lure 10. The shaft 21 of hook 16 is permitted to swing in an arc not greater than 45 degrees, and the entire hook 16 may tilt from side to side about the longitudinal axis of the shaft 21 up to 120 degrees. The preferred swinging arc is 25 degrees and the preferred tilting arch is 90 degrees. This device also emits a fish attracting sound vibration when hook shaft 21 hits inside surfaces of yoke 20.

Figure 3:
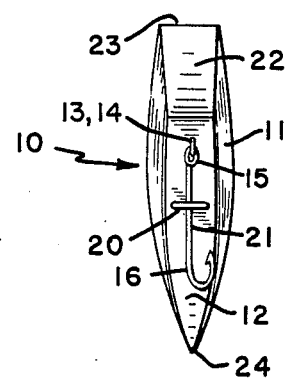
FIG. 3 is a top view of the preferred embodiment of the present invention.

FIG. 3 shows the tilting movement of fishing hook 16. The degree of tilt, as previously discussed, is limited to an arc of 120 degrees, and is preferably limited to an arc of 90 degrees. This limitation is controlled by the gagues and diameters of the the eye 15 of the hook 16 and the attachment means 13. Comparison of the alignment of the eye 15 in FIG. 1 and FIG. 2 illustrates this limitation. Since the eye 15 and the attachment means 13 are interconnected and attachment means 13 is permanently secured to body 11, hook 16 tilt is controlled as described.

Figure 4:
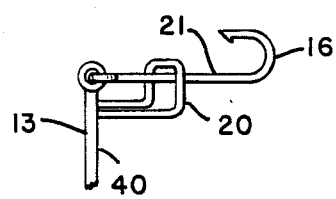
FIG. 4 shows an alternate retention means for the present invention.

As FIG. 4 shows, yoke 20 may be incorporated into transverse retention means 13 as a single unit, securred to the upright member 40 of attachment means 13 instead of to body 11.

Figure 5:
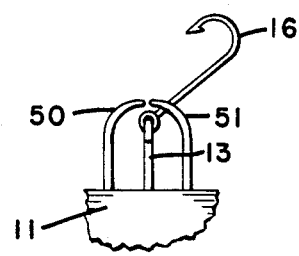
FIG. 5 shows another alternate retention means for the present invention.

As FIG. 5 shows, yoke 20 may be separated into a left member 50 and a right member 51, each of which curves upward and inward. Members 50, 51 are substantially adjacent to each other at their innermost points to prevent undesired movement of fishing hook 16 out of yoke 20. Members 50, 51 remain substantially rigid, but a hook shaft 21 can be forced between them for replacement of the hook 16.

Figure 6:
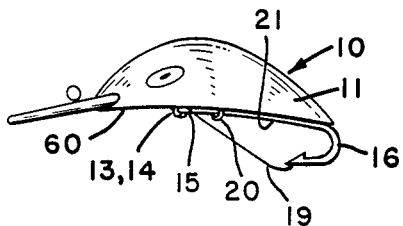
FIG. 6 shows a side view of a second embodiment of the present invention.

FIG. 6 shows a side view of a second preferred embodiment wherein the hook 16, the yoke 20 and the attachment means 13 are at the bottom 60 central area of the body 11. That is, the attachment means 13 is secured to the body 11 at a bottom 60 point which is in a vertical plane passing through the longitudinal axis of the body 11. The swinging and tilting abilities are similar to that described for the top mounted embodiment except the hook 16 curves downward instead of upward.

While this invention has been described in detail with particular reference to a preferred embodiment thereof, it will be understood that variations and modifications can be effective within the spirit and scope of the invention as described hereinbefore and as defined in the appended claims.

INDUSTRIAL APPLICABILITY

This invention is capable of exploitation in the sporting goods industry and is particularly useful in the sport fishing industry.

I claim:
1. A fishing lure comprising:
   a fish hook having an eye and shank;
   a body having: a substantially flat top nose portion, a substantially flat top back portion, and two relatively teardrop shaped side portions;
   a hook attachment means secured atop said flat back portion in a vertical plane passing through the longitudinal axis of said body, and having an aperture to secure said eye;
   a yoke positioned atop said back in perpendicular alignment to said attachment means, located a predetermined distance away from said attachment means, forming a second aperture completely bordered on three sides by said yoke and one side by said flat top back portion, having said shank extending through said second aperture;
   said fish hook being pivoted about said eye, being swung in a back and forth motion along a lateral arc parallel to and across said flat back, and having said shank strike said second aperture during said back and forth motion.

2. The apparatus of claim 1 wherein the predetermined distance is relative to the width of the inside dimension of the yoke.

3. The apparatus of claim 2 wherein the width of the yoke is not greater than 82.61% of the distance from the yoke to the attachment means.

4. The apparatus of claim 3 wherein the preferred width of the yoke is about 45.83% of the distance from the yoke to the attachment means.

5. The apparatus of claim 3 wherein the yoke has an inside dimension of 0.1250 inch and is positioned 0.1513 inch from the attachment means.

6. The apparatus of claim 5 wherein the fishing hook is restricted to swinging laterally, from side to side, in an arc of about 45 degrees.

7. The apparatus of claim 4 wherein the yoke has an inside dimension of 0.1250 inch and is positioned 0.2728 inch from the attachment means.

8. The apparatus of claim 7 wherein the fishing hook is restricted to swinging laterally, from side to side, in an arc of about 25 degrees.

9. The apparatus of claim 3 wherein the yoke has an inside dimension of 0.1875 inch and is positioned 0.2270 inch from the attachment means.

10. The apparatus of claim 9 wherein the fishing hook is restricted to swinging laterally, from side to side, in an arc of about 45 degrees.

11. The apparatus of claim 4 wherein the yoke has an inside dimension of 0.1875 inch and is positioned 0.4091 inch from the attachment means.

12. The apparatus of claim 11 wherein the fishing hook is restricted to swinging laterally, from side to side, in an arc of about 25 degrees.

13. The apparatus of claim 3 wherein the entire hook may tilt from side to side about the longitudinal axis of the shaft in an arc of up to 120 degrees.

14. The apparatus of claim 13 wherein the preferred tilting arch is about 90 degrees.

15. The apparatus of claim 13 wherein the tilt limitation is controlled by the gagues and diameters of the the eye of the hook and the attachment means.

* * * * *